(12) United States Patent
Jones et al.

(10) Patent No.: US 8,270,820 B2
(45) Date of Patent: Sep. 18, 2012

(54) ARCHIVING AND SHARING OF MULTIMEDIA CONTENT

(75) Inventors: Michael J Jones, Corvallis, OR (US);
Thomas McFarland, Corvallis, OR (US); Derek Roller, Corvallis, OR (US);
Kathy Shelby, Corvallis, OR (US);
Brian E Cripe, Corvallis, OR (US);
Pieter J. van Zee, Corvallis, OR (US);
Gabe Beged-Dov, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 4178 days.

(21) Appl. No.: 09/792,791

(22) Filed: Feb. 23, 2001

(65) Prior Publication Data

US 2002/0118949 A1    Aug. 29, 2002

(51) Int. Cl.
*H04N 5/93* (2006.01)
*H04N 9/80* (2006.01)

(52) U.S. Cl. ......... 386/353; 386/248; 386/283; 386/284

(58) Field of Classification Search ............ 386/120, 386/1, 45, 95, 108, 125, 117, 126, 248, 283, 386/284, 353; 348/120, 231.3, 231.99, 231.6
See application file for complete search history.

(56) References Cited

U.S. PATENT DOCUMENTS

| | | | |
|---|---|---|---|
| 4,930,160 A | 5/1990 | Vogel | 380/23 |
| 5,387,942 A | 2/1995 | Lemelson | 348/474 |
| 5,491,562 A | 2/1996 | Kaneda | |
| 5,543,851 A | 8/1996 | Chang | 348/468 |
| 5,561,457 A | 10/1996 | Cragun et al. | 348/13 |
| 5,659,366 A | 8/1997 | Kerman | 348/460 |
| 5,703,655 A | 12/1997 | Corey et al. | 348/468 |
| 6,141,299 A | 10/2000 | Utsumi | |
| 6,160,953 A | 12/2000 | Fuchgami et al. | |
| 6,414,725 B1 * | 7/2002 | Clarin et al. | 348/714 |
| 6,424,795 B1 * | 7/2002 | Takahashi et al. | 386/120 |
| 6,496,228 B1 * | 12/2002 | McGee et al. | 348/700 |
| 6,535,645 B2 * | 3/2003 | Bright et al. | 382/248 |
| 6,647,200 B1 * | 11/2003 | Tanaka | 386/46 |
| 6,690,881 B1 * | 2/2004 | Tomita et al. | 386/117 |
| 6,697,568 B1 * | 2/2004 | Kaku | 386/117 |
| 6,804,295 B1 * | 10/2004 | Belknap | 375/240.01 |
| 7,912,346 B2 * | 3/2011 | Terada | 386/241 |
| 2002/0199190 A1 * | 12/2002 | Su | 725/37 |
| 2008/0071586 A1 * | 3/2008 | Logan | 705/4 |

FOREIGN PATENT DOCUMENTS

| | | |
|---|---|---|
| EP | 0 949 825 | 10/1999 |
| JP | 11007705 | 6/1997 |
| JP | 2000029472 | 7/1998 |
| JP | 2000132459 | 10/1998 |

(Continued)

OTHER PUBLICATIONS

Zander; "Multimedia Photo-CD-Speichern Digitaler Bilder"; FKT Fernseh und Kinotechnik, Heidelberg, DE, vol. 48, No. 4, Apr. 1, 1994, pp. 187-194.

(Continued)

*Primary Examiner* — Helen Shibru (57) ABSTRACT

Multimedia content is stored onto a relatively permanent, portable storage medium in accordance with at least two standards that allow the content to be recovered on a playback device with the highest possible resolution and fidelity. Linking between the various types of content stored according to the at least two standards allows the presentation of content at the highest quality possible.

38 Claims, 5 Drawing Sheets

FOREIGN PATENT DOCUMENTS

| | | | |
|---|---|---|---|
| JP | 02001223980 A | * | 2/2000 |
| WO | WO98/47135 | | 10/1998 |
| WO | WO 99/27470 | | 6/1999 |

OTHER PUBLICATIONS

Chastain; "Graphics Software", Internet, Apr. 1, 2000, XP-002246562.

Phillips System Standards & Licensing—dvd specifications [online] Available: http://www.licensing.philips.com/dvdsystems/dvdspecs.html [Feb. 16, 2001].

Kodak: Kodak Picture CD-FAQ/Support [online] available: http://webqa.kodak.com/glogal/en/consumer/products/pictureDC/mac/supportInd...[Feb. 2, 2001].

Kodak: Kodak Picture CD-Overview, System Requirements [online] available: http//webs.kodak.com/global/en/consumer/products/pictureCD/pc/system.shtml [Feb. 2, 2001].

Video CD Internet Guidelines Version 1.0 Apr. 1997; Phillips Consumer Electronics B.V., Apr. 1997.

Video CD Specification Version 2.0; Philips Consumer Electronics B.V. Apr. 1995.

The Future Image Report; vol. 8, Issue 7, Jan. 2001; "Napster"-Like WEB Photo Sharing Bravo Labs to Boost High-Res Inkjet Printing by Paul Worthington.

DVD FAQ—Official Mirror [online] Available: http://www.thedigitalbits.com/officialfaq.html [Jan. 31, 2001].

Compteition to Query [online] Available: http://www.vcdinternet.com/competition.html [Jan. 31, 2001].

CD Standards [online] Available: http://www.weddingvideosondvd.com [Jan. 31, 2001.

EmMe [online] Available: http://www/dazzle.com/products/emme_gut.html [Feb. 9, 2001].

Digital Photo & Video Maker [online] Available: http://www.dazzle.com/products/photo_gut.html [Feb. 9, 2001].

Dazzle Multimedia Provides Innovative and Affordable Digital Video Compression, Capture [online] Available: http://www.dazzle.com/main.html [Feb. 9, 2001].

Compatibility of DVD [online] Available: http://www.cs.cf.ac.uk/Dave/Multimedia/node132.html, [Jan. 31, 2001].

DVC Digital Video Creator [online] Available: http://www.dazzle.com/products/vidcr_gut.html, [Feb. 9, 2001].

DVC II Digital Video Creator II [online] Available: http://www.dazzle.com/products/vidcr2)gut.html [Feb. 9, 2001].

EPO Office Action dated Dec. 16, 2010 cited in corresponding EP counterpart Serial No. 02709594.2 filed Feb. 14, 2002.

Ulead—"VideoStudio5"; XP-001146481; Ulead Systems, Inc.; User Guide; Nov. 2000 pp. 1-72.

* cited by examiner

ARCHIVING AND SHARING OF MULTIMEDIA CONTENT

BACKGROUND

The present invention generally relates to the archiving and sharing of multimedia data and more particularly relates to method and apparatus that enables multi-format content to be recorded on, interrelated with, and reproduced from a single removable storage medium.

Even the most technically naïve consumer has been affected by and most likely has made the switch from analog media to digital media for preservation of music. Relative sales volumes of vinyl records and cassette tapes to music compact disks (CDs) clearly show the consumer's preference for digital recorded audio. While aficionados may offer a spirited defense of vinyl records and cassette tapes, the permanence, durability, capacity, and technical performance of digital recordings have captured the market. Compact disk players, the necessary audio component for reproducing the recorded audio content, are now ubiquitous and inexpensive.

A similar revolution appears to be occurring in the reproduction of video content. Digital storage of video content, movies and the like, is moving from the accepted analog videotape standard to a digital storage standard. Usually, this digital storage is on a CD medium, although high-end consumer video recording is being done using a digital videotape medium. At this time, a plurality of digital video standards exists, but the most widely accepted standards can be categorized into DVD standards (Digital Versatile Disk, a listing of the applicable specifications may be found at www.licensing.philips.com/dvdsystems/dvdspecs.html) and Video CD (VCD) standards (generally referred to as the "White Book" and titled Video CD Specification Version 2.0, Philips Consumer Electronics B. V., April 1995) and variations and updates of these standards (for example, Super Video CD). While players for the higher resolution DVD standard CDs can easily be designed to play VCD standard CDs (because the MPEG-2 standard data compression used by DVD also encompasses the MPEG-1 standard data compression used by VCD), the reverse is not easily accomplished and therefore is not done for economic reasons. JVC, Philips, Sony, and Matsushita introduced VCD in 1993—long before DVD was developed. VCD supports 74 minutes of VHS-quality audio and video (to an MPEG-1 standard) on a readily available CD medium. Video CD never caught on in the US due to the large installed base of VHS video cassette recorders and no overwhelming technical quality improvement. The DVD standard, however, is apparently overcoming this resistance due to significant advancements in audio and video quality, availability of a significant number of movie titles, and new functionality such as multiple camera angles. Nevertheless, Video CD dominates the Asian market, where VCD movies and players are as common as VHS tapes and players in the US. Because of the Asian market support for VCD (and because it is a relatively simple and inexpensive feature to add, due to DVD's use of MPEG-2 compression technology, which is a superset of VCD's MPEG-1 technology), most of the DVD players available in the US and worldwide markets support VCD as well as DVD. It should also not be ignored that VCD standard CDs are currently easier and less expensive to produce than DVD standard CDs.

Mass market still image photography is at the entrance to the digital age. Of course, professional photography has been using digital storage and image enhancement for some time, but the digital capture and storage of images for consumers is a relatively new development. Consumer digital cameras are becoming common in the marketplace and consumers are beginning to acquire the cameras in rapidly increasing numbers. It is expected that digital cameras will overtake conventional film cameras based on the silver-halide, chemical, process. Digital cameras typically store the captured images in computer files on one of various digital storage media selected by the camera manufacturer and the user subsequently downloads the stored images to a computer, printer, or other external device for conversion to human perceptible form. Often a silver-halide print is digitized or the original digital camera image is re-stored on a CD using a still image specification like the professional "PhotoCD", a Kodak, Inc. proprietary technology, or "PictureCD", employing the more familiar JPEG standard, based upon computer CD ROM storage technology. Obviously, the still images stored on a CD using the PictureCD standard are readable by a computer, but they are not generally readable by a conventional VCD player or a conventional DVD player.

Consumers do not need to be familiar with computer technology to enjoy the content of digital format movies and digital format music. Digitally recorded movies and digitally recorded music are accessible and enjoyable without any computer involvement. Similarly a consumer today can buy a film camera or a video camcorder (even a digital video camcorder) and happily use it without any knowledge of computers. The film can be processed and printed by any number of photo processors, and the camcorder can be plugged into the TV at any time to view the family videos.

In contrast to these familiar technologies, the purchaser of a digital still camera must have access to a computer (or a properly equipped computer printer), significant experience in using it (installing and updating digital camera software is no easy matter), and available time to spend at the keyboard to produce hardcopy prints of acceptable quality. The consumer photography industry is attempting to address this problem by providing digital camera kiosks in retail locations that will accept and print digital photos. Unfortunately, this solution only recovers parity with the current silver-halide film development process. Furthermore, the consumer must still resort to a computer to access or share their digital photos in the many ways enabled by digital technology.

In review, then, there are multiple standards available for the digital recording of audio, video, and still images and there are multiple standards of placing the digital recordings on a removable storage medium such as a CD. How can one simply perform these operations? More importantly, how can a non-technophile aggregate and coordinate audio, video, and still images into an easy to produce removable storage medium and then share the production with another non-technophile having a generally available consumer electronics player?

SUMMARY OF THE INVENTION

Content is archived by accepting first content in the form of at least two independent computer data files. Second content is generated in the form of one data file from the accepted first content. The at least two independent computer data files of accepted first content and the one data file of the generated second content are stored on a single removable storage medium.

DETAILED DESCRIPTION OF A PREFERRED EMBODIMENT

The present invention encompasses the storing of personal content on a removable storage media in a format that is compatible with today's home entertainment centers (DVD and VCD players), personal computer hardware (CD-ROM and DVD-ROM drives) and various application software for digital imaging (for example, applications such as PictureIt!™ available from Microsoft Corp.), and selected imaging appliances (for example, the PictureMaker™ kiosks of Kodak, Inc.). The format includes additional data for linking these different data formats and enabling user scenarios such as pausing a multimedia slideshow on a particular image of interest and printing a corresponding high-resolution image from data stored in a different format.

As used herein, the term "format" means a general arrangement or plan of an item and the term "standard" means a set of specifications, often very detailed, for physical and logical characteristics of an item. Also, the term "removable storage media" means compact disks (CDs) in a preferred embodiment, but more generally includes other types of machine-readable mass data and information storage devices that are easily human transportable and fashioned primarily for consumer (rather than industrial or military) use.

Digital still cameras are improving in terms of functionality, image quality, ease-of-use, and affordability at an amazing pace. They currently exceed the capability and usability of other aspects of the digital imaging system. Currently, the HP PhotoSmart 912 camera captures 2.24 megapixel still images and can add audio annotations. The Fuji Finepix 40i camera takes 2.4 megapixel stills, 80 second quarter-VGA video files with sound (that are quite compelling when viewed on a television screen), and has a built-in MP3 (Motion Picture Experts Group 1, Layer 3 Audio) player. The Aiptek PenCam, an inexpensive digital camera, can take 75 small photos or a 10 second small video clip. Soon the consumer will have many choices for affordable digital cameras that are easy to use, fit in one's shirt pocket, and capable of the capture of large amounts of high quality photos and broadcast television quality video and sound. There is almost a certainty of strong consumer demand for easy-to-use products that support the archiving, viewing, and sharing of these personal media. Today's digital cameras use either built-in or removable memory. Inexpensive cameras typically offer a few megabytes of built-in memory, and more expensive cameras have a slot for CompactFlash, SmartMedia, Memory Stick, or similar large memory capacity modules. Removable camera memory is expensive, however. Because of this high cost of camera memory, most digital camera users own a limited amount that they reuse frequently. Typical user behavior is to bring a laptop computer along with them and offload camera pictures frequently. This extra hardware and manipulation is a barrier to consumers who wish to convert from film camera use to digital camera use. Nevertheless, today's digital camera and computer enthusiast can cope with having to frequently connect the camera to the personal computer to offload pictures. But the non-computer owner who is considering switching from a conventional film camera to a digital camera will need a solution similar to today's film paradigm. The photographer who is dependent on retailer photo-processing services must be able to afford enough digital camera memory to last between visits to the photo counter.

Consumers are not experienced with viewing their photos on their television (TV), however, they are very accustomed to viewing home video captured with a camcorder on a TV. Consumers have become familiar with the use of DVDs to play video movie content. Many of the DVD players available today in the US and worldwide market support an alternative format called Video CD (VCD, specified by the White Book). This cross-video standard playback can be a great benefit in certain instances but only offers a partial solution to a much greater consumer expectation. Today's entertainment center is designed to offer access to professional entertainment media (e.g., TV shows, movies, and music). Non-professional (home) users desire to interact with home images (photos and video) in similar ways.

Printing has minimal support and adoption within the home entertainment center. The printing support that does exist is designed around user tasks such as printing web pages from services such as WebTV or printing material associated with Interactive TV (such as the recipe that accompanies a cooking show). The present invention creates at least two new requirements for entertainment center printing, neither of which has been addressed previously. The first requirement is printing of local (i.e. stored on a local CD or DVD) content; the second requirement is linking, or cross-referencing, from the images being viewed to corresponding high resolution data. Alternative embodiments are contemplated and additional ones are possible. The first embodiment includes the printing directly from the analog video signal, use of a view/print appliance, or the use of IEEE 1394-based printing from a DVD player properly equipped.

Television screens produce amazingly good results with low-resolution images. VGA resolution images (640×480; approximately ¼ megapixel computer images) look very good on a television screen. Even quarter-VGA video (320×240) that is common in today's multimedia digital cameras is enjoyable on a TV. The result is that cameras optimized for television viewing can be very low resolution and inexpensive. Current experience is that inexpensive VGA digital cameras can be used to make compelling multimedia slideshows.

Almost all photo processors offer the extra-cost service of having one's photos scanned and stored on a CD-ROM disk as computer data files readable by a computer with a compatible applications program. This concept is well-understood by the market, though not yet widely adopted by consumers. The problem with the current capability is that the CD-ROM disks that are produced are mainly of use to the computer-based digital enthusiast. However, the availability of this service from photo processors seems to be a growing technology and manufacturing processes are in place to create the needed CDs. Furthermore, CD-RW drives, which can write as well as read CDs, have become widely available in consumer personal computers, partly due to the digital music phenomenon. It has become much more commonplace for computer enthusiasts to create music CDs with a custom collection of material and "burn" it on a CD. This practice is driving availability of CD writers and inexpensive CD media, and is establishing the consumer practice of using a computer to create media that will be played in the entertainment center.

There is no single technology on the market today for creating disks that are both affordable and widely compatible with today's DVD players. CD-R media is very affordable but it is compatible with only certain models of current DVD players. Empirical testing indicates that about 1 in 4 of today's DVD players will reliably play CD-R media, however, it appears that compatibility is improving in order to support home-burned music CDs. DVD-R writers and media are available today that have good compatibility with DVD players. However, the technology is expensive (perhaps 30 times more expensive than a CD-R disk). DVD+RW writers and media are not readily available but there are suggestions that they will experience good compatibility and be offered at a lower disk price in the future. The most promising solution to this problem is a new effort by the OSTA (Optical Storage Technology Association—a CD and DVD industry standards body) to create a "MultiPlay" compatibility program to certify DVD players that support both CD-R and CD-RW media (as well as read-only CDs). When these certified players are introduced, then CD-R and CD-RW disks will be compatible with any DVD player that is MultiPlay certified.

Figure 1A:
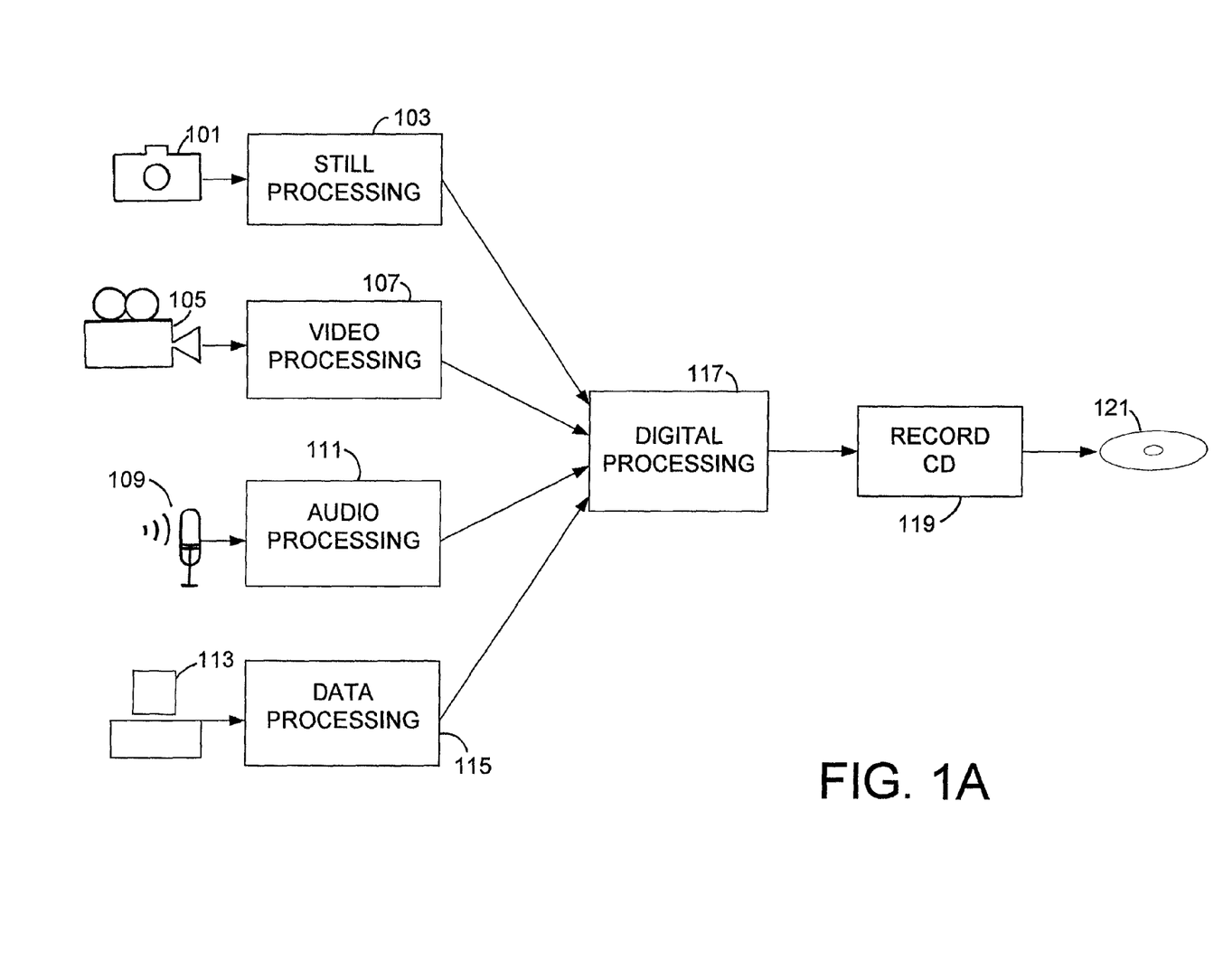
FIGS. 1A and 1B are functional block diagrams of the environment which benefits from the present invention.
Figure 1B:
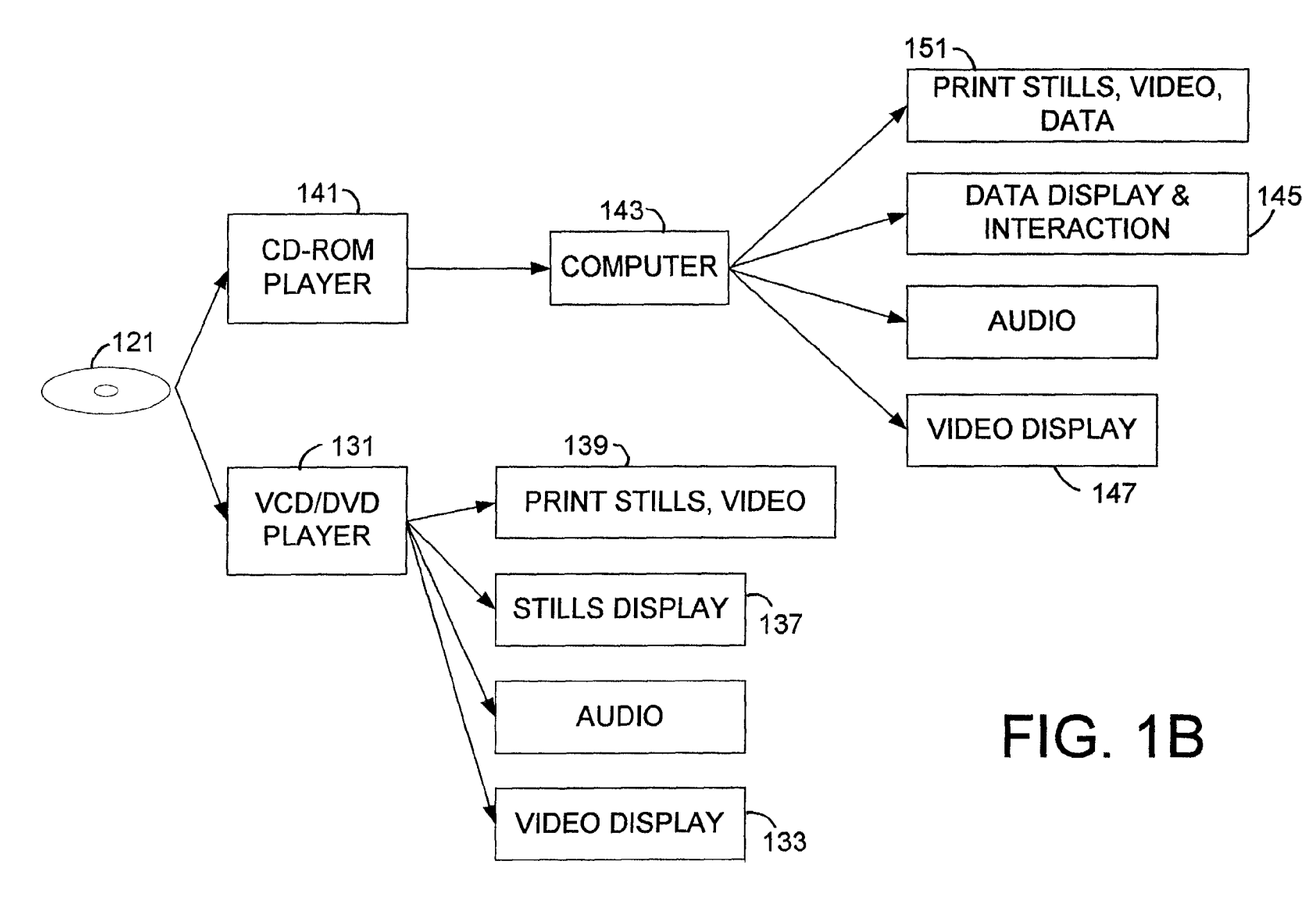

A general depiction of the environment which benefits from the present invention is shown in the diagrams of FIGS. 1A and 1B. It is desired to collect content from a number of content sources, record them on a single removable storage medium, and recover the content, to its optimum, using widely available consumer-type reproduction devices. Four sources of content are shown, but are not necessarily exclusive. A source of still images 101 is coupled to a still image processor 103 for correction of image parameters (sharpness, contrast, color, etc.) and sometimes data compression prior to additional use. (The still image source is expected to provide a digital representation of the image in a high resolution data file such as a TIFF (Tagged Image File Format) or JPEG (Joint Photographic Experts Group) file. An analog still image (for example, a silver-halide film picture or slide) can also be scanned and converted into a digital representation). A source of digital video content 105 is coupled to a video processor 107 for image correction and data compression. (Analog video must first undergo digital conversion). An audio source 109 provides audio content, which can be associated with the video source 105 (as is often the case) or associated with the still image source 101 (as is becoming increasingly common with digital still cameras and the short video clips that are often created by still image cameras), or which provides stand-alone audio information. The audio input, when not directly associated with the other content providers, is coupled to an audio processor 111 for digital sampling (when necessary), volume level, tone balance, error correction, and compression before being of further use. Information of other types, for example, text and graphic images, is accepted from a content source 113, such as a personal computer, and coupled to a data processor 115.

In a preferred embodiment, the still image processor 103 is an image processing application program such as Adobe Photoshop® b6.0, Sierra Imaging Image Expert™ 2000, or ArcSoft Photostudio™ b2000, each of which can output image files to JPEG or TIFF standards from content in a variety of formats. The video processor 107 is a moving video processing application program offering video sequence editing, such as Ulead Video Studio™ 4.0, MGI VideoWave™, Adobe Premier 5.0, or Adaptec CD Creator™ 4.0 Deluxe. Most of the aforementioned video applications programs accept an associated audio input with the video input and either alone, or with an adaptor, generate video output MPEG (Motion Picture Experts Group) standard format. The audio processor 111 can be chosen from many of the "ripping" tools available for obtaining the desired audio; e.g., the MusicMatch Jukebox provides MP3 output audio files and Windows Sound Recorder provides output into WAV files, which can be subsequently converted to MP3. While the data processor 115 could be essentially any applications program for file creation, an application program that creates metadata—descriptive data (such as titles, time information, or background information) for the other content files—is of particular usefulness for the preferred embodiment.

Figure 2:
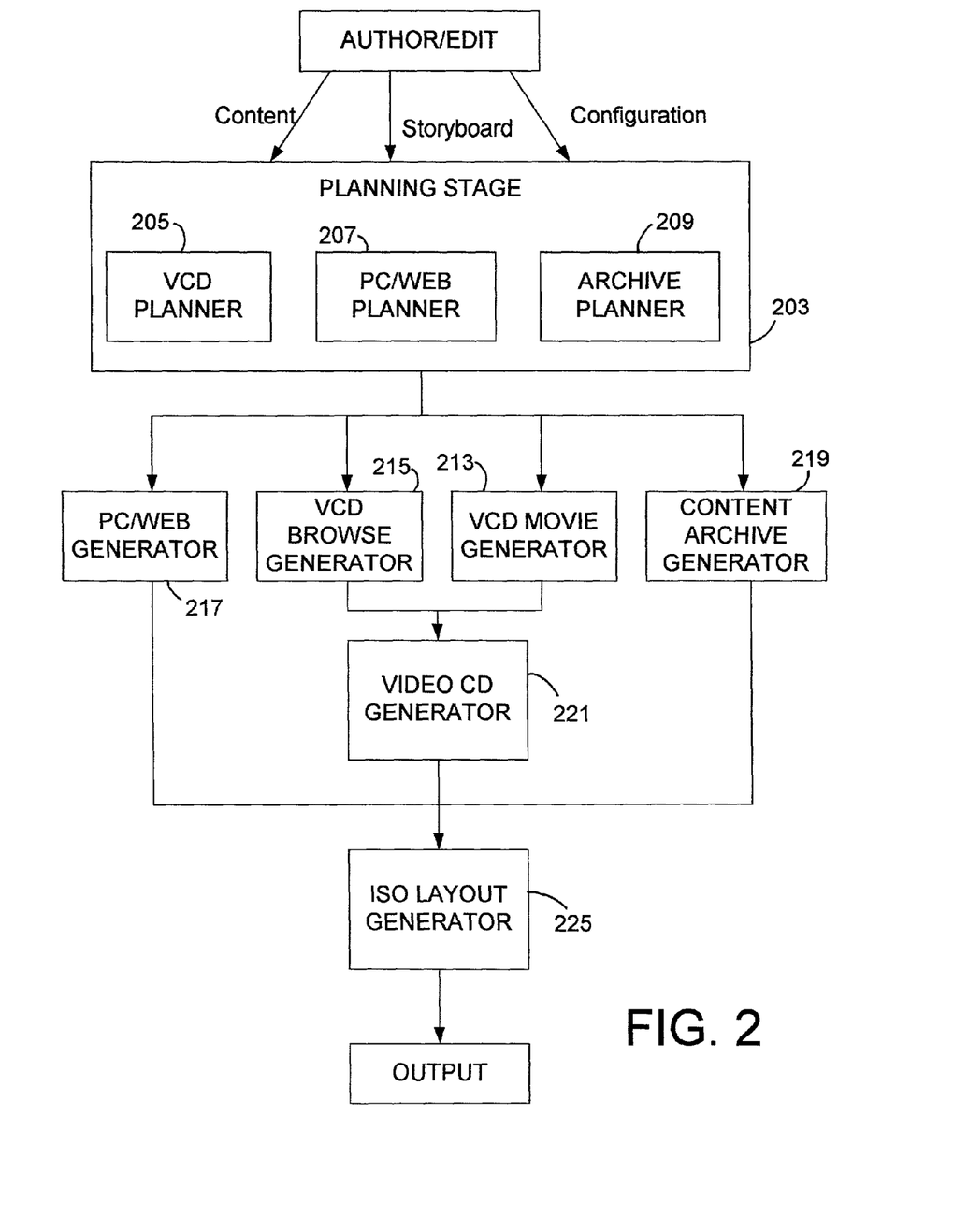
FIG. 2 is a functional process diagram which may employ the present invention.

Digital processor 117 undertakes the process shown in the functional process diagram of FIG. 2, that of taking the set of inputs created from the content sources and in an interactive session with the user/author, produces all of the translated (taking the content data in its current format and ensuring that it is made compatible with the appropriate output standard) data necessary for creating an output suitable for recording (mastering), at 119, on a CD 121. In a preferred embodiment, a planning stage 203 includes a VCD planner 205, a PC/Web planner 207, and an archive planner 209. These planners generate recipes for the creation of each of several user playback experiences, including: PC/Web view/browse, VCD browse, VCD movie, and content archive in accordance with the relevant standards. The recipies include the storyboard direction for the sequence, duration of image display, title screens, specification of audio track, image orientation, and the like. The output from the planning stage 203 is then divided according to the content and its format into a VCD movie generator 213, a VCD browse generator 215, a PC/Web view/browse experience generator 217, and a content archive generator 219. There are essentially three types of author controlled or generated inputs to the planning stage 203: content, storyboard, and configuration information. The content inputs are the actual media assets like still images, audio tracks, and video clips. The storyboard is a logical description of the desired user experience(s) that are to be created, for example, the parameters of a photograph slide show like the sequence of images, the display duration time for each image, and the title for the slide show. The configuration information includes all of the settings and commands that are specific to this invocation of the planning stage. The logic that passes control to the planning stage is responsible for creating these inputs and passing the location of the inputs into the planning stage. The planning stage 203 takes the storyboard and the configuration information for what tasks are being requested and generates the detailed workflow for the subsequent tasks. The content archive generator 219 is responsible for mapping all of the assets that are intended for archival purposes to their locations in the file system on the recording media. The VCD movie generator 213 takes in a series of content (one or more multimedia assets) that are allocated to a timeline along with a configuration file, and generates an MPEG-1 output video stream file from it. The VCD browse generator 215 is responsible for creating all of the content that is needed for the VCD browse experience. This VCD browse content includes the following: contact sheet(s) of thumbnails encoded as MPEG-1 video stream file(s) and TV-resolution images encoded as MPEG-1 video stream files. The VCD browse generator 215 generates thumbnails, if not available, by invoking an image processing utility (such as Adobe Photoshop®), allocates thumbnails to screens, lays out screens using thumbnails and imaged text, and generates one or more contact sheets by invoking the image mixing tool in an image processing utility and then converting to MPEG-1 video stream format. The PC/Web view/browse generator 217 is responsible for creating the content and the description assets needed for managing the user experience in the PC environment by using the storyboard and planner generated recipe. This includes creating the view, browse, and print user desired outputs. The view content is an executable program and media content which, when invoked on a personal computer, will display the media content in a continuous presentation. The browse content, much like that produced by the VCD browse generator, includes thumbnails of images, PC resolution images, etc. as necessary for the PC browse experience. The VCD movie generator 213 reformats the content, which may be JPEG still images or MPEG video clips, into an MPEG-1 standard video stream, including setting parameters like size, color gamut, aspect ratio, and the like. In an alternative embodiment, such reformatting is performed in the video processor.

The Video CD generator 221 accepts inputs from the movie generator 213 and VCD browse generator 215 and lays down control files. All of the files needed for VCD playback (e.g., in a DVD player) need to be generated by the Video CD generator in compliance with the White Book standards.

The ISO layout generator 225 takes the layouts from the three generators, web/PC generator 217, content archive generator 219, and VideoCD generator 221 and creates a final disk pre-image before the disk itself is created. This disk pre-image is done by file reference for memory conservation and is basically a "packing list" that is intended for consumption by the mastering (recording) phase. The packing list includes all of the ISO 9660 file system logical layout and the block device mapping information for the aspects of the layout that need to be bound at that level. The main example of this is some of the VideoCD files that need to be pinned to specific track locations on behalf of access methods that are not file-system based.

Thus an output from the digital processor 117 is created in folders (sub-directories) complying with the CD-ROM(XA) and Video CD (White Book) standards and also includes, in a preferred embodiment, a "PICTURES" folder (with files compatible with the PictureCD specification), a "VIDEOS" folder (with files compatible with the MPEG-1 standard), an "AUDIO" folder (with files compatible with the WAV standard), and, optionally, an "OTHERS" folder (with files otherwise compatible with ISO 9660). The CD mastering (recording) function 119 employs conventional hardware and software to take the foregoing disk pre-image information from the digital processor 117 and create, or "burn", the recording into the writable CD disk 121. It should be noted that the process depicted in FIG. 1A can have overlapping functions found in each block, depending upon the selected applications program inherent capabilities.

Linking of content resident in one standard to related content in another standard is accomplished, in the preferred embodiment, by file name coordination. For example, the movie generator 213 accepts still images to JPEG standards and, in accordance with the storyboard and configuration information input to the planner 203, processes the stills into images in a continuous video to MPEG-1 standards. A portion of each MPEG-1 video image is encoded, in the preferred embodiment, with the file name, in ASCII, of the JPEG file of the original associated still image. Other methods of file identification may also be used in alternative embodiments, including simply providing the high resolution file name in the image as it is presented in the video (thereby enabling the subsequent viewer the opportunity to manually copy the file name for later access), storing the file name in other little used portions of the video, steganographically incorporating the file name into the image, or using MPEG video frame number of play time value to correlate the currently displayed image back to a high resolution JPEG version of the image. The content archive generator 219 also operates upon the high resolution JPEG still images, placing each image in a folder named "PICTURES" with a sequential file name IMG001.jpg, IMG0002.jpg, etc., thereby facilitating the linking of a low resolution video images (with the same image identifier, or name, encoded by methods previously described) with the high resolution image data file of the same name. Similar linkages are formed for the audio files and the other data files.

Figure 3:
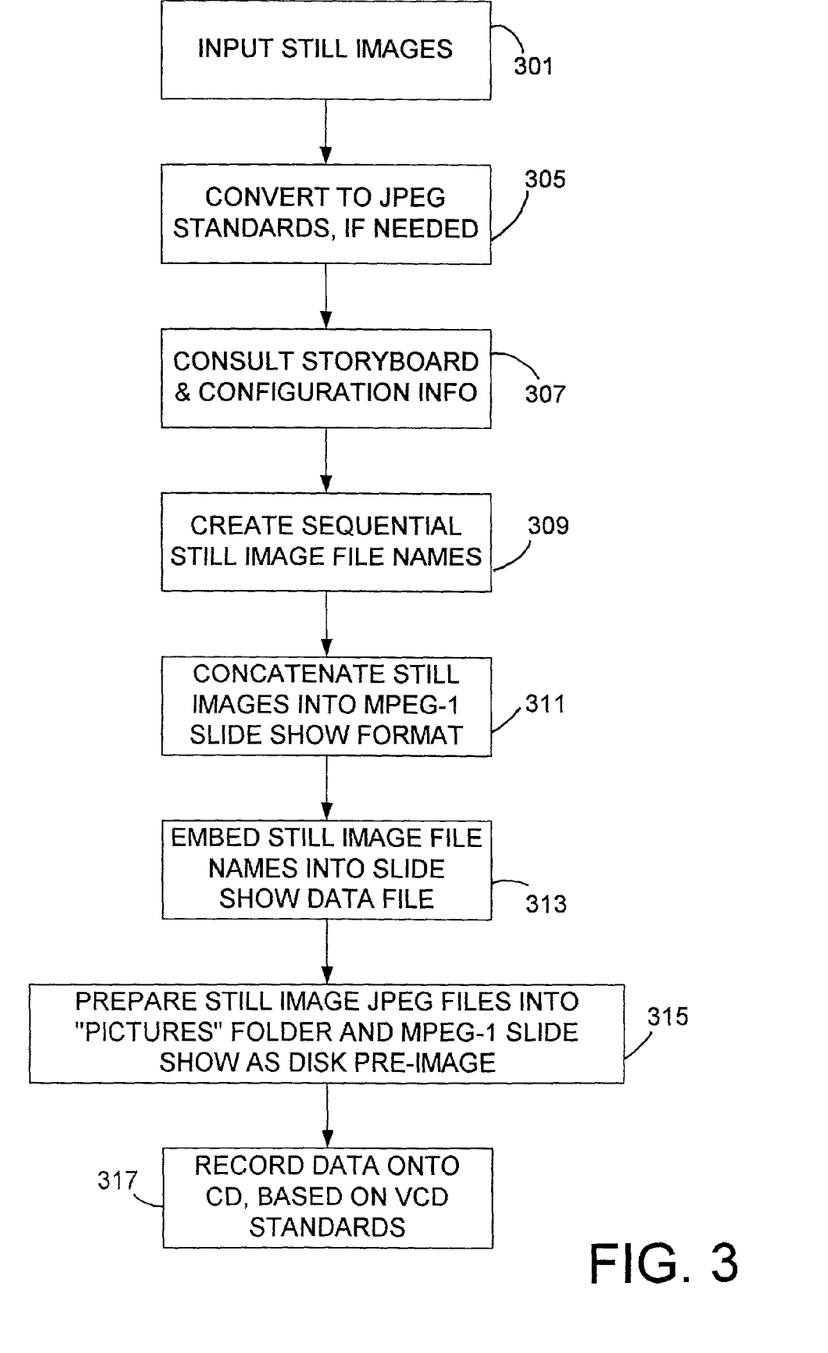
FIG. 3 is a flowchart of a method of producing a slide show movie, which may be employed in the present invention.

The process of creating, for example, a slide show in a preferred embodiment of the present invention is illustrated in the flowchart of FIG. 3. The still images are input, at 301, to the still processor 103 for image processing and conversion to JPEG-compatible file format, at 305, if the still files are not already compatible with the JPEG standards. The digital processor 117 consults the storyboard and configuration information, at 307, to set the experience parameters for the slide show and proceeds to create the sequential still image file names, at 309, which will be used to link the low resolution video content to the high resolution still image content on the CD. The video slide show is generated by concatenating the still images and audio, when desired, into a movie format and saving the results in a data file compliant with MPEG-1 standards, at 311 and the still image sequential file names are embedded, at 313, into the slide show such that for the duration of each "slide" the high resolution still image file can be accessed by file name from the video movie format. The disk pre-image is prepared, at 315 in a preferred embodiment, by saving the still image JPEG files into a folder named "PICTURES" and saving the folder and the MPEG-1 standard slide show to the disk pre-image. The disk pre-image is then used by the CD recorder 119 to burn the data to the writable CD 121.

Figure 4:
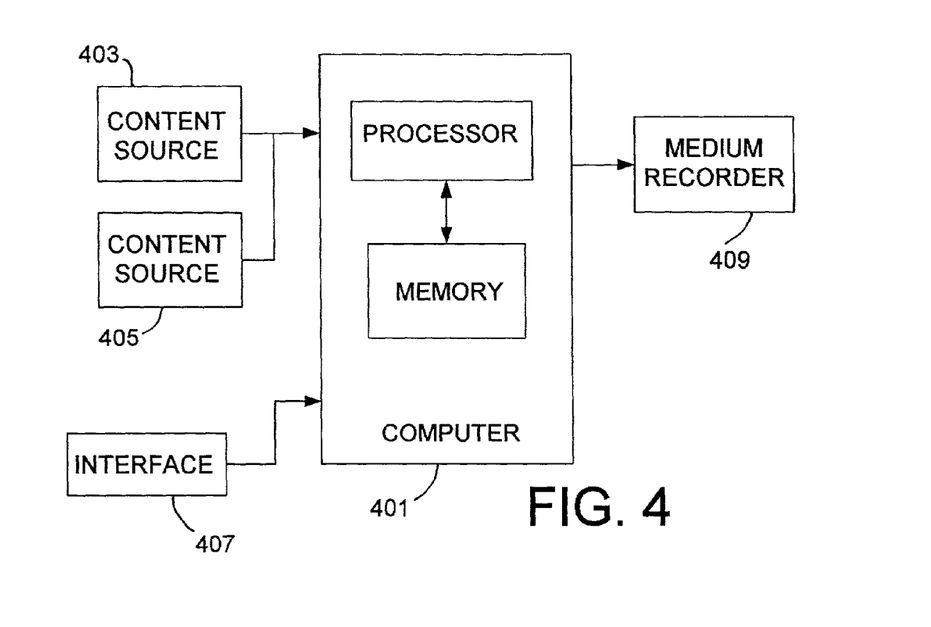
FIG. 4 is a block diagram of an apparatus which may employ the present invention.

The apparatus needed, in the preferred embodiment, to create the writable CD is illustrated in the block diagram of FIG. 4. A computer 401, such as a Pavilion, available from Hewlett-Packard Company, employing a Pentium III, 800 MHz microprocessor with 64 Megabytes of RAM and 10 Gigabytes of hard drive memory, is installed with the selected foregoing applications programs. One or more content sources 403, 405 are coupled to the appropriate input port(s) of the computer in order that still images, video, audio, and other content can be delivered for processing. The human user/author interacts with the computer via one or more interfaces 407 (for example, a keyboard, a video monitor, and a mouse). Output from the computer 401 is delivered in writable CD specified format to the medium recorder 409, which, in the preferred embodiment, is a CD-Writer Plus manufactured by Hewlett-Packard Company.

The foregoing processing of content, its subsequent digital processing, and recording can be performed in the user's home or by using external functions such as can be found from Internet service providers, from a retail service access point (a physical in-store processor like kiosk-based processing systems), or from a tool-kit for a portable authoring system.

Once a removable multimedia storage device, like CD 121, is created, it can be distributed to others for their performance (i.e., the presentation of an experience) of the content that is resident on the CD. It is a feature of the present invention that the writable CD is playable on a wide variety of playback apparatus. Returning to FIG. 1B, two commonly available consumer-type of playback apparatus are depicted. A DVD/VCD player 131 has become a widely used entertainment device for consumers. Most players designed for DVD disk playback also play VCD disks because the MPEG-2 standard data compression used by DVD players also encompasses the MPEG-1 standard found on CDs using the VCD standard. Most players for DVD disks are capable of playing audio CD disks, as well, thereby providing an audio output for a listener. Of course, the DVD/VCD player provides video output for display through a television video display device 133. Generally, the television display device conforms to broadcast television standards (NTSC (350×240 pixels, interlaced), PAL (350×576 pixels, non-interlaced), SECAM, etc.) and delivers video images at low resolution. Newer standards, HDTV for instance, provide a higher resolution (for example, 1280×1024 pixels, a little more than a megapixel in one implementation) in a wider screen format, but have not yet seen much market penetration. Still images are usually converted to a single image presented, depicted as being delivered to a display 137 (which, in a conventional home environment, is most likely a television set) and using MPEG movie standards, as a "slide show". The slide show of still images presented in a sequence of images can have a dwell time set by the author for each image measured in seconds or more.

Still images that have been stored according to the PictureCD standard, for example, typically have a much higher resolution (for example, 1536×1280 pixels, approximately 2 megapixels) than the video presentation, but the conversion to standard broadcast television standards, or even HDTV standards, do not present the full resolution to the viewer.

It is a feature of the present invention that the various outputs can be linked or coordinated such that presentation to the viewer is optimized for the highest fidelity, resolution, and the best quality of image presentation possible from the player and display device. In operation this means that a viewer watching video format content can select an image or frame of the video content and request it to be printed on a printing device 139 with a resolution better than the resolution of the image being viewed.

Another example of a common CD player is that of a CD-ROM player 141, normally associated with a personal computer 143. The usual function of such a CD-ROM player is to convey digital information (data, computer files, applications programs, etc.) to the computer 143 for subsequent actions. Advanced versions of the CD-ROM player include the capability to read and output DVD, VCD, still (PictureCD standard) format, and audio CD information to the computer 143. In addition to the usual computer data/graphics display for interaction by the user, at 145, the computer can provide video on the computer monitor display 147 (typically at resolutions better than that of conventional television sets). The display of still images from the PictureCD standard, and high fidelity image capture devices like digital cameras using other standards, can be better than that provided by conventional television sets. With the use of suitable applications programs, the full resolution of the stored images can be accessed and partially displayed (by a "zoom" feature) on the computer monitor but not as the full image. As mentioned above, one of the features of the present invention is the linking of the stored information (in different formats) so that the optimum quality can be presented to the user. The linked image is then displayed on a video display 133 or printed on a printing device 151.

Playback of a CD employing the present invention can be performed in several different venues depending upon the desires of the user. Examples of the venues are a user's living room, a user's personal computer location, and a retail service access point (such as a mass merchandiser's photographic processing kiosk). Of course, combinations of the playback venues are expected to be available to the user. A living room experience would likely include a television set and a DVD/VCD player. The DVD/CVD player reads, in the preferred embodiment, a CD having video content encoded using MPEG-1 standards and audio encoded to MPEG-1 Audio Layer 3 (MP3) standards, and delivers an NTSC standard video signal to the television set. The resolution/fidelity is low but very acceptable—and often better than off-the-air (broadcast) reception—for television viewing. A slide show presentation can be presented to the viewer as a sequential photo show with each image presented to the viewer for a dwell time determined by the author, with a background music track, image to image fading transition, captioning, and other features creatively inserted by the author. Alternatively, the slide show can be presented as a browse format in which thumbnail representations of the images are superimposed on a background and are selectable by the viewer for larger display on the television in the typical low resolution mode. A DVD/CVD player having an appropriate data output port (for example a USB or an IEEE 1394 port) presents high resolution image data linked to the image displayed to a printer.

Figure 5:
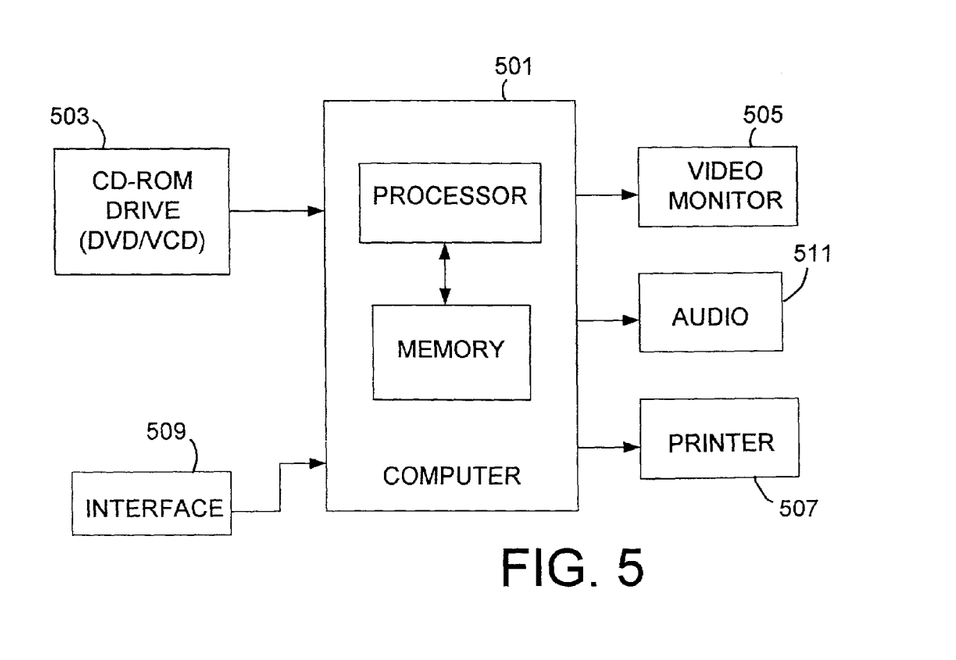
FIG. 5 is a block diagram of an apparatus which may employ the present invention.

A personal computer venue, perhaps needing more technical agility from the user, is expected to have a computer with a CD-ROM drive, a video monitor, and a printer configured to perform normal computer-related tasks. A content laden CD can be read by the CD-ROM drive. The images are delivered from a "PICTURES" data file and delivered to the video monitor in a resolution established by a computer monitor, e.g., VGA or SVGA standard. If the CD-ROM drive is capable of playing DVD/CVD CD disks, a video slide show recorded to the MPEG-1 standards, will (upon the viewer's request) be presented to the video monitor for relatively low-resolution viewing, typically in a small portion of the display. A block diagram of the equipment used in a preferred embodiment of this venue is shown in FIG. 5. A computer 501, such as a Pavilion manufactured by Hewlett-Packard Company, employing an 800 MHz Pentium III microprocessor, 64 Megabytes of RAM and 10 Gigabytes of hard disk memory, is coupled to a CD-ROM drive 503 (capable of playing DVD/CVD disks), such as a DVD drive manufactured by Hewlett-Packard Company; a video monitor 505 such as a SuperScan Elite 751 manufactured by Hitachi; and a printer 507 such as a Deskjet 970Cxi manufactured by Hewlett-Packard Company. One or more interface 509 apparatus, such as a keyboard and mouse, and audio reproduction apparatus 511 are also coupled to the computer 501. When the CD-ROM drive 503 plays the video content of a slide show from the desired CD, the MPEG-1 standard content is read and the content is delivered as continuous video to the video monitor 505 with a VGA standard picture resolution. Encoded into the MPEG-1 continuous video, in a preferred embodiment, is a representation of the identification of a high resolution data file of the images used in the slide show. Likewise, audio can be read from an MP3 file and delivered to the audio apparatus while a high fidelity uncompressed or essentially losslessly compressed data file exists for linking to the MP3 audio. The viewer is able to select a particular image from the slide show, by a mouse click in a preferred embodiment, and the associated image stored in the high resolution data file is accessed and delivered to the printer for printing of the higher quality image. A similar interconnection of hardware is used for the retail service access point for delivery of printed images or a CD with images in a different selected order.

It is a feature of the present invention that content stored in accordance with different standards is linked in such a manner that the highest quality content is delivered to one output device of the user's even though the user may be viewing or perceiving related content on another output device from a lower quality standard. In a preferred embodiment, a video slide show of images and accompanying sound track is recovered from a CD upon which the video slide show was imprinted according to the MPEG-1 standard. Each image was selected by the author to be viewed for a selected period of time before transitioning to the next image. The transition type, the background, and the audio selection, among other things were also selected by the author and integrated by the author's digital processor 117 into the MPEG-1 standard. The images are also stored on the CD in accordance with the high resolution JPEG standard in a data file. In a preferred embodiment, the JPEG standard images are stored in a folder named "PICTURES", with each image file named sequentially IMG0001.jpg, IMG0002.jpg, etc. Likewise each audio segment is stored in a folder named "AUDIO" with each audio file named sequentially AUD0001.wav, AUD0002.wav, etc. And related documentation and text is stored in a folder named "OTHERS" with sequential file names of OTH0001.txt, OTH0002.txt, etc. When the slide show (taken from the MPEG-1 standard stored content) is played on a video monitor in an emulation of NTSC television, an ASCII character set file name is recovered from a portion of the displayed image, for example, in part of one line of video at the top of the picture. The name of the particular file, IMG0002.jpg for example, is encoded with ASCII text in the first row of pixels in the displayed image. This name is thus available to the computer 501 processor. If the viewer clicks the mouse button while the second image is displayed on the video monitor (NTSC television format, MPEG-1 standard storage of the mpg slide show file), the computer uses the available ASCII IMG0002.jpg name to access the high resolution JPEG image file of image number two. This JPEG file is then delivered, in some instances modified by an automatic picture formatter, to the printer for a high resolution print of the second image even though the user is viewing the lower MPEG-1 resolution image on the monitor. A more advanced implementation provides the JPEG file to an image processing application software program for user enhancement of the image before printing the image. Similar ASCII characters are used to access higher fidelity audio files and related text files for presentation to the viewer. It should be noted that other linking techniques may also effectively provide a connection between one content standard to another. For one example, MPEG video provides a run time that can be linked to a high resolution image file by a look-up table correlating the run time to the high resolution image file. For another example, the identity of the high resolution file can be recovered from field 2 line 21 of the vertical blanking interval of the NTSC standard television signal in a manner similar to the recovery of text for closed captioning. See the EIA 766 Extended Data Services standards. The name of the particular file, IMG0002.jpg for instance, is transmitted in ASCII in the vertical blanking interval during the time the second image of the video slide show is being displayed. This file name is thus available to the computer 501 processor. If the viewer clicks the mouse button while the second image is displayed on the video monitor (NTSC television format, MPEG-1 standard storage of the .mpg slide show file), the computer uses the ASCII IMG0002.jpg name from the vertical blanking inverval to access the high resolution JPEG image file of image number two. This JPEG file is then delivered, in some instances modified by an automatic picture formatter, to the printer for a high resolution print of the second image even though the user is viewing the lower MPEG-1 resolution image on the monitor. The high resolution file name may also be steganographically encoded into the entire image for later recovery by the computer processor.

It is interesting to pose several scenarios of consumer need to understand how the present invention offers improvement in human enjoyment and communication: Jane purchases a digital camera and takes a large number of photos. She takes her camera to her corner drugstore, plugs it into the input port of the photo kiosk located there, and requests two sets of conventional photo prints and a CD employing the present invention. She returns in an hour and picks up her prints and disk. The prints are viewed and shared in the normal manner. She takes the CD home, pops it into her DVD player, turns on the television, views the picture slide show, and then uses her remote control to browse through thumbnails and full-screen images of all her digital photos. She then places the CD in the rack next to her television set. Jane also owns and continues to use a traditional film camera. She uses it to take four rolls of film, which she brings to her corner drugstore for processing. She requests a CD employing the present invention in addition to her prints. The photo-processing system in use at the drugstore digitally scans her photos and writes the digital content onto a CD employing the present invention.

Jane wants an 8×10 enlargement of one of her vacation photos. She selects the CD (employing the present invention) from that trip, puts it in her DVD player, and browses the content until she finds the desired photo. She writes down the photo number which is presented on-screen, takes the disk back to her corner drugstore, and requests an 8×10 enlargement of the particular photo. After the CD is returned, Joey (Jane's son) takes the CD from the rack, inserts it into the CD-ROM drive of his personal computer, views the slide show, selects some photos, and prints them on the conventional printer connected to his computer. Joey also wants a professional 8×10 enlargement of one of the photos. He takes the CD to his local drugstore, inserts it into CD-ROM drive of the Kodak PictureMaker™ kiosk, selects the photo, and creates an 8×10 print.

John is a loyal customer of a particular mass merchandiser for photo processing services; he uses them to obtain all of his prints and CDs employing the present invention. John is looking for a particular photo to use in his Christmas newsletter. He logs onto his personal account at the mass merchandiser's website photo center and browses the extensive catalog of photos he has taken over the years. The web site offers sophisticated search techniques, allowing him to search for all photos of his daughter Julie. He finds the right photo and discovers it is on a particular CD he has in his collection, titled "More Misc Photos" that was processed on Jul. 12, 1999. He locates that CD, inserts it into his computer CD-ROM drive, and copies the photo into his newsletter.

Bill, also a customer of a particular mass merchandiser for photo processing services and for obtaining all of his prints and CDs. Bill desires to send to his extended family something more than the conventional Christmas newsletter; that is, a compilation of a number of the pictures he has taken over the years. He logs onto his personal account at the mass merchandiser's website photo center and browses the photos he has taken. He selects photos along with a music background and other pleasing production features for his disk and enters the mailing list for his family member recipients. For the appropriate fee, the service produces his disks and mails them to his mailing list.

Sam buys an inexpensive digital camera that fits into his pocket, takes 1 Megapixel still images, and captures 80 second VHS-quality video and audio clips. Sam takes the camera with him to a family reunion. Over the course of the day he takes 100 MB of still images intermixed with video clips. On the way home he stops at the corner drugstore to get prints of all the photos and a CD that employs the present invention. At home he inserts the CD into his DVD player and he and his family watch the photos and video clips. Sam later puts the family reunion CD into the CD-ROM drive of his computer. He selects some of the photos and video clips and arranges them in a directory in the order he creates. He takes a music track from a source that allows royalty free or paid-up royalty use of the music and selects his desired selection. He enters "Smith Family Reunion, 2001" as the title inserted a CD-RW disk into the recording device, clicks the "create" button and five minutes later his disk is done. He takes it to his television and watches it on his DVD player. He likes it, so he goes back to his personal computer and burns six more copies for other members of his extended family.

In each of the foregoing scenarios, the user wants to put personalized content onto a relatively permanent, portable storage medium in a format that allows the content to be recovered on virtually any common consumer playback device and with the highest possible resolution and fidelity available. Linking between the various types of content stored according to the standards associated with each type of content allow the presentation of content at the highest quality possible.

We claim:

1. A method of archiving content, comprising the steps of:
   accepting first content in the form of at least two independent data files;
   generating said second content in the form of one data file conforming to a video standard from said accepted first content;
   storing said at least two independent data files of accepted first content and said one data file of said generated second content on a single removable storage medium; and creating a linkage between said accepted first content and said generated second content and storing said linkage on said single removable storage medium.

2. A method in accordance with the method of claim 1, wherein said step of accepting first content further comprises the step of accepting said first content in the form of at least two independent data files conforming to the JPEG standard.

3. A method in accordance with the method of claim 1, wherein said step of generating second content further comprises the step of generating said second content in the form of one data file conforming to the MPEG-1 standard.

4. A method in accordance with the method of claim 1, wherein said step of storing further comprises the step of storing on a single removable storage medium in a form conforming to the VCD standard.

5. A method in accordance with the method of claim 1, wherein said step of storing further comprises the step of storing on a single removable storage medium in a form conforming to the DVD standard.

6. A method in accordance with the method of claim 1, wherein said step of storing further comprises the step of storing said at least two independent data files of said accepted first content in a data folder named "PICTURES".

7. A method in accordance with the method of claim 1 further comprising the steps of creating a linkage between said accepted first content and said generated second content and storing said linkage on said single removable storage medium.

8. A method in accordance with the method of claim 7 wherein said step of creating a linkage further comprises the steps of determining a unique identifier for each of said at least two independent data files and embedding said unique file identifiers in said one data file of said second content.

9. A method of archiving content, comprising the steps of:
   accepting first content in the form of at least two independent data files conforming to the JPEG standard;
   generating said second content from said accepted first content in the form of one data file conforming to the MPEG-1 standard;
   storing said at least two independent data files of accepted first content and said one data file of said generated second content on a single removable storage medium conforming to the VCD standard; and
   creating a linkage between said accepted first content and said generated second content and storing said linkage on said single removable storage medium.

10. A method in accordance with the method of claim 9, wherein said step of storing further comprises the step of storing said at least two independent data files of said accepted first content in a data folder named "PICTURES".

11. A method in accordance with the method of claim 9 wherein said step of creating a linkage further comprises the steps of determining a unique identifier for each of said at least two independent data files and embedding said unique file identifiers in said one data file of said second content.

12. A method of archiving content, comprising the steps of:
   accepting first content in the form of at least two independent data files;
   generating said second content in the form of one data file conforming to a video standard from said accepted first content;
   creating a linkage between said accepted first content and said generated second content; and
   storing said at least two independent data files of accepted first content, said one data file of said generated second content, and said created linkage on a single removable storage medium.

13. A method in accordance with the method of claim 12 wherein said step of creating a linkage further comprises the steps of determining a unique identifier for each of said at least two independent data files and embedding said unique file identifiers in said one data file of said second content.

14. A method in accordance with the method of claim 12, wherein said step of accepting first content further comprises the step of accepting said first content in the form of at least two independent data files conforming to the JPEG standard.

15. A method in accordance with the method of claim 12, wherein said step of generating second content further comprises the step of generating said second content in the form of one data file conforming to the MPEG-1 standard.

16. A method in accordance with the method of claim 12, wherein said step of storing further comprises the step of storing on a single removable storage medium in a form conforming to the VCD standard.

17. A method in accordance with the method of claim 12, wherein said step of storing further comprises the step of storing on a single removable storage medium in a form conforming to the DVD standard.

18. Apparatus that creates a sharable multimedia archive, comprising:
   a still image processor that inputs image content in the form of at least two independent data files;
   a digital processor that generates video content in the form of a single data file in conformance with a video standard from said at least two independent data files;
   a data recorder that stores said at least two independent data files and said single data file on a single removable storage medium; and
   linkage generator that references said image content from said single data file.

19. Apparatus in accordance with claim 18, further comprising a JPEG converter to convert said at least two independent data files to at least two respective independent data files conforming to the JPEG standard when said image content at least two independent data files do not conform to the JPEG standard.

20. Apparatus in accordance with claim 18, wherein said digital processor further comprises a video content generator that generates said single data file to conform to the MPEG-1 standard.

21. Apparatus in accordance with claim 18, wherein said data recorder further comprises a disk image generator that creates a single removable storage medium conforming to the VCD standard.

22. Apparatus in accordance with claim 18, wherein said data recorder further comprises a disk image generator that creates a single removable storage medium conforming to the DVD standard.

23. Apparatus that archives content, comprising:
- means for accepting first content in the form of at least two independent data files;
- means for generating said second content in the form of one data file conforming to a video standard from said accepted first content;
- means for storing said at least two independent data files of accepted first content and said one data file of said generated second content on a single removable storage medium; and
- means for creating a linkage between said accepted first content and said generated second content and storing said linkage on said single removable storage medium.

24. Apparatus in accordance with claim 23 wherein said means for accepting first content further comprises means for accepting said first content in the form of at least two independent data files conforming to the JPEG standard.

25. Apparatus in accordance with claim 23, wherein said means for generating second content further comprises means for generating said second content in the form of one data file conforming to the MPEG-1 standard.

26. Apparatus in accordance with claim 23, wherein said means for storing further comprises means for storing on a single removable storage medium in a form conforming to the VCD standard.

27. Apparatus in accordance with claim 23, wherein said means for storing further comprises means for storing on a single removable storage medium in a form conforming to the DVD standard.

28. Apparatus in accordance with claim 23, wherein said means for storing further comprises means for storing said at least two independent data files of said accepted first content in a data folder named "PICTURES".

29. Apparatus in accordance with claim 23 wherein said means for creating a linkage further comprises means for determining a unique identifier for each of said at least two independent data files and means for embedding said unique file identifiers in said one data file of said second content.

30. Apparatus that creates a sharable multimedia archive, comprising:
- means for accepting first content in the form of at least two independent data files conforming to the JPEG standard;
- means for generating said second content from said accepted first content in the form of one data file conforming to the MPEG-1 standard;
- means for storing said at least two independent data files of accepted first content and said one data file of said generated second content on a single removable storage medium conforming to the VCD standard; and
- means for creating a linkage between said accepted first content and said generated second content and means for storing said linkage on said single removable storage medium.

31. Apparatus in accordance with claim 30, wherein said means for storing further comprises means for storing said at least two independent data files of said accepted first content in a data folder named "PICTURES".

32. Apparatus in accordance with claim 30 wherein said means for creating a linkage further comprises means for determining a unique identifier for each of said at least two independent data files and means for embedding said unique file identifiers in said one data file of said second content.

33. Apparatus that archives content, comprising:
- means for accepting first content in the form of at least two independent data files;
- means for generating said second content in the form of one data file conforming to a video standard from said accepted first content;
- means for creating a linkage between said accepted first content and said generated second content; and
- means for storing said at least two independent data files of accepted first content, said one data file of said generated second content, and said created linkage on a single removable storage medium.

34. Apparatus in accordance with claim 33 wherein said means for creating a linkage further comprises means for determining a unique identifier for each of said at least two independent data files and means for embedding said unique file identifiers in said one data file of said second content.

35. Apparatus in accordance with claim 33, wherein said means for accepting first content further comprises means for accepting said first content in the form of at least two independent data files conforming to the JPEG standard.

36. Apparatus in accordance with claim 33, wherein said means for generating second content further comprises means for generating said second content in the form of one data file conforming to the MPEG-1 standard.

37. Apparatus in accordance with claim 33, wherein said means for storing further comprises means for storing on a single removable storage medium in a form conforming to the VCD standard.

38. Apparatus in accordance with claim 33, wherein said means for storing further comprises means for storing on a single removable storage medium in a form conforming to the DVD standard.

* * * * *